United States Patent [19]
Ahluwalia et al.

[11] Patent Number: 5,697,250
[45] Date of Patent: Dec. 16, 1997

[54] COMPACT MANUAL TRANSAXLE

[75] Inventors: Pavinder Ahluwalia, Manlius, N.Y.; David Brown, Hopton Diss, United Kingdom

[73] Assignee: New Venture Gear, Inc., Troy, Mich.

[21] Appl. No.: 681,337

[22] Filed: Jul. 22, 1996

[51] Int. Cl.⁶ .................................................. F16H 3/093
[52] U.S. Cl. ................................................................ 74/331
[58] Field of Search ...................................... 74/331, 359

[56] References Cited

U.S. PATENT DOCUMENTS

| | | |
|---|---|---|
| 4,174,644 | 11/1979 | Nagy et al. . |
| 4,463,622 | 8/1984 | Freiburger . |
| 4,640,141 | 2/1987 | Knodel et al. . |
| 4,738,149 | 4/1988 | Janiszewski . |
| 4,738,150 | 4/1988 | Miner . |
| 4,776,227 | 10/1988 | Janiszewski . |
| 4,799,395 | 1/1989 | Janiszewski . |
| 4,799,399 | 1/1989 | Bruce ........................... 74/331 |
| 4,802,373 | 2/1989 | Saint-Jean et al. . |
| 5,311,789 | 5/1994 | Henzler et al. . |
| 5,375,482 | 12/1994 | Dangel ........................ 74/359 |
| 5,385,065 | 1/1995 | Hofmann . |
| 5,479,835 | 1/1996 | Esparsa et al. . |
| 5,495,775 | 3/1996 | Lees et al. . |

FOREIGN PATENT DOCUMENTS 2081825  2/1992  United Kingdom .

*Primary Examiner*—Dirk Wright
*Attorney, Agent, or Firm*—Harness, Dickey & Pierce, P.L.C.

[57] ABSTRACT

A compact manual transaxle includes an input shaft having five fixed input gears, a first intermediate shaft rotatably supporting four speed gears meshing with four of the input gears, a second intermediate shaft rotatably supporting a speed gear meshed with the other input gear and a reverse gear meshed with a speed gear on the first intermediate shaft, and a differential. A transfer gear on each intermediate shaft is meshed with a final drive gear fixed to the differential. The transaxle further includes a pair of synchronizer clutches for establishing four forward gears by selectively coupling the four speed gears to the first intermediate shaft and a synchronizer clutch for establishing one additional forward gear and the reverse gear by selectively coupling the speed gear and reverse gear to the second intermediate shaft.

5 Claims, 2 Drawing Sheets

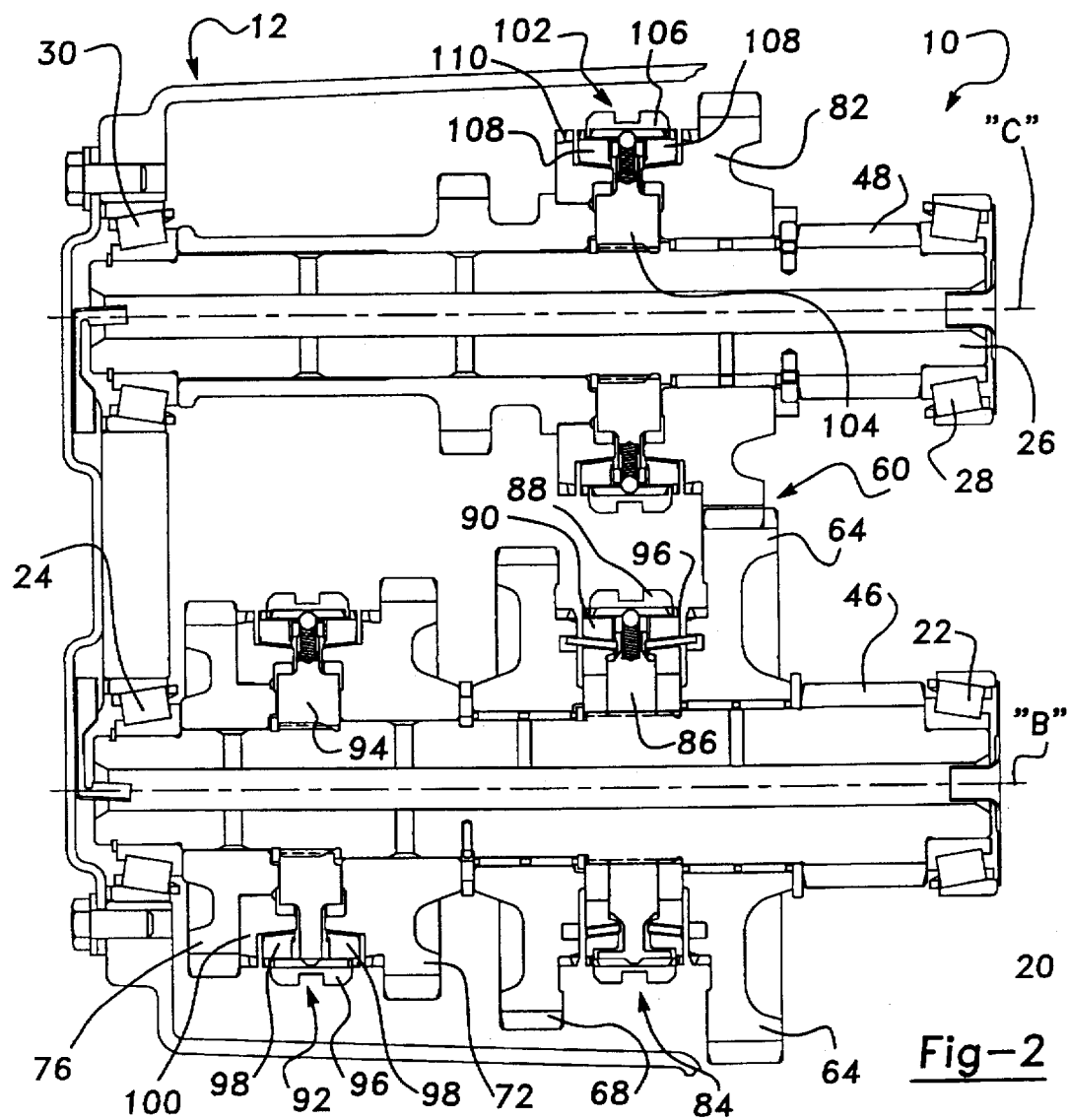
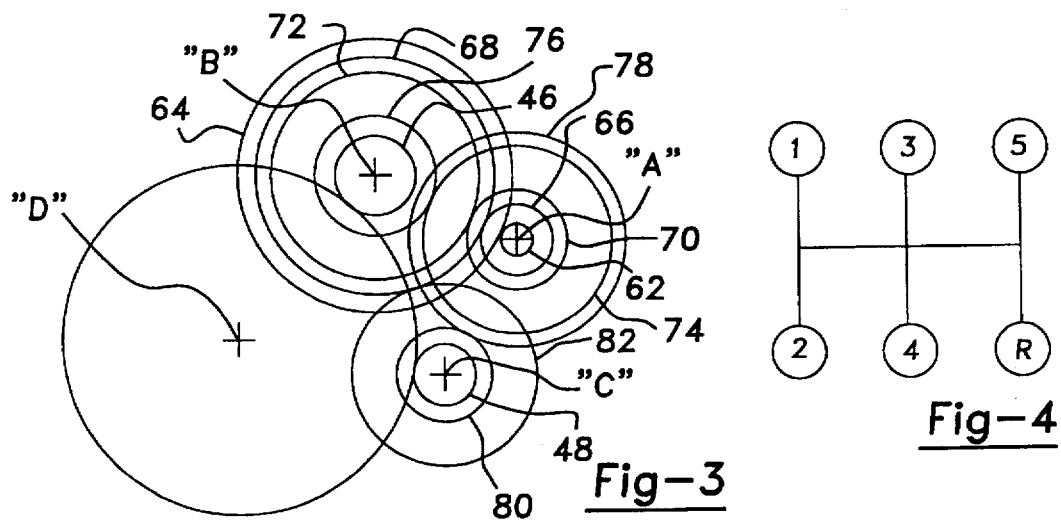

COMPACT MANUAL TRANSAXLE

BACKGROUND OF THE INVENTION

This invention relates generally to manual multi-speed transmissions for use in motor vehicles. More specifically, the present invention is directed to a compact manual transaxle having a synchronized reverse gear.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. As such, minimizing the overall axial length of the transaxle as well as its shaft center distances is of critical importance to the transmission designer. To meet these requirements, various "three-shaft" type transaxle have been developed. For example, U.S. Pat. No. 4,738,150 discloses a five-speed manual transaxle having an input shaft and a pair of countershafts both of which drive the differential which, in turn, drives the axle half-shafts. Gearsets on both countershafts can be selectively engaged to deliver power from the input shaft to the half-shafts. Furthermore, U.S. Pat. Nos. 5,385,065 and 5,495,775 disclose five-speed transaxles having a synchronized reverse gear arrangement.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs.

To this end, the present invention is directed to a five-speed manual transaxle comprised of an input shaft, a first intermediate shaft having a first transfer gear fixed thereto, a first input gear fixed to the input shaft, a first speed gear rotatably supported on the first intermediate shaft and meshed with the first input gear, a second input gear fixed to the input shaft, a second speed gear rotatably supported on the first intermediate shaft and meshed with the second input gear, a first synchronizer clutch for selectively coupling either of the first and second speed gears to the first intermediate shaft, a third input gear fixed to the input shaft, a third speed gear rotatably supported on the first intermediate shaft and meshed with the third input gear, a fourth input gear fixed to the input shaft, a fourth speed gear rotatably supported on the first intermediate shaft and meshed with the fourth input gear, a second synchronizer clutch for selectively coupling either of the third and fourth speed gears to the first intermediate shaft, a second intermediate shaft having a second transfer gear fixed thereto, a fifth input gear fixed to the input shaft, a fifth speed gear rotatably supported on the second intermediate shaft and meshed with the fifth input gear, a reverse gear rotatably supported on the second intermediate shaft and meshed with the first speed gear, a third synchronizer clutch for selectively coupling either of the fifth speed gear and the reverse gear to the second intermediate shaft, and a final drive gear meshed with the first and second transfer gears.

BRIEF DESCRIPTION OF THE DRAWINGS

Further objects, features and advantages of the present invention will become apparent to those skilled in the art from studying the following description and the accompanying drawings in which:

FIG. 2 is a partial sectional view of the five-speed manual transaxle shown in FIG. 1;

FIG. 3 is a schematic view showing the shaft and gear arrangement for the transaxle shown in FIG. 1; and FIG. 4 is a shift gate diagram for the transaxle shown in FIG. 1.

DETAILED DESCRIPTION OF THE PREFERRED EMBODIMENT

Figure 1:
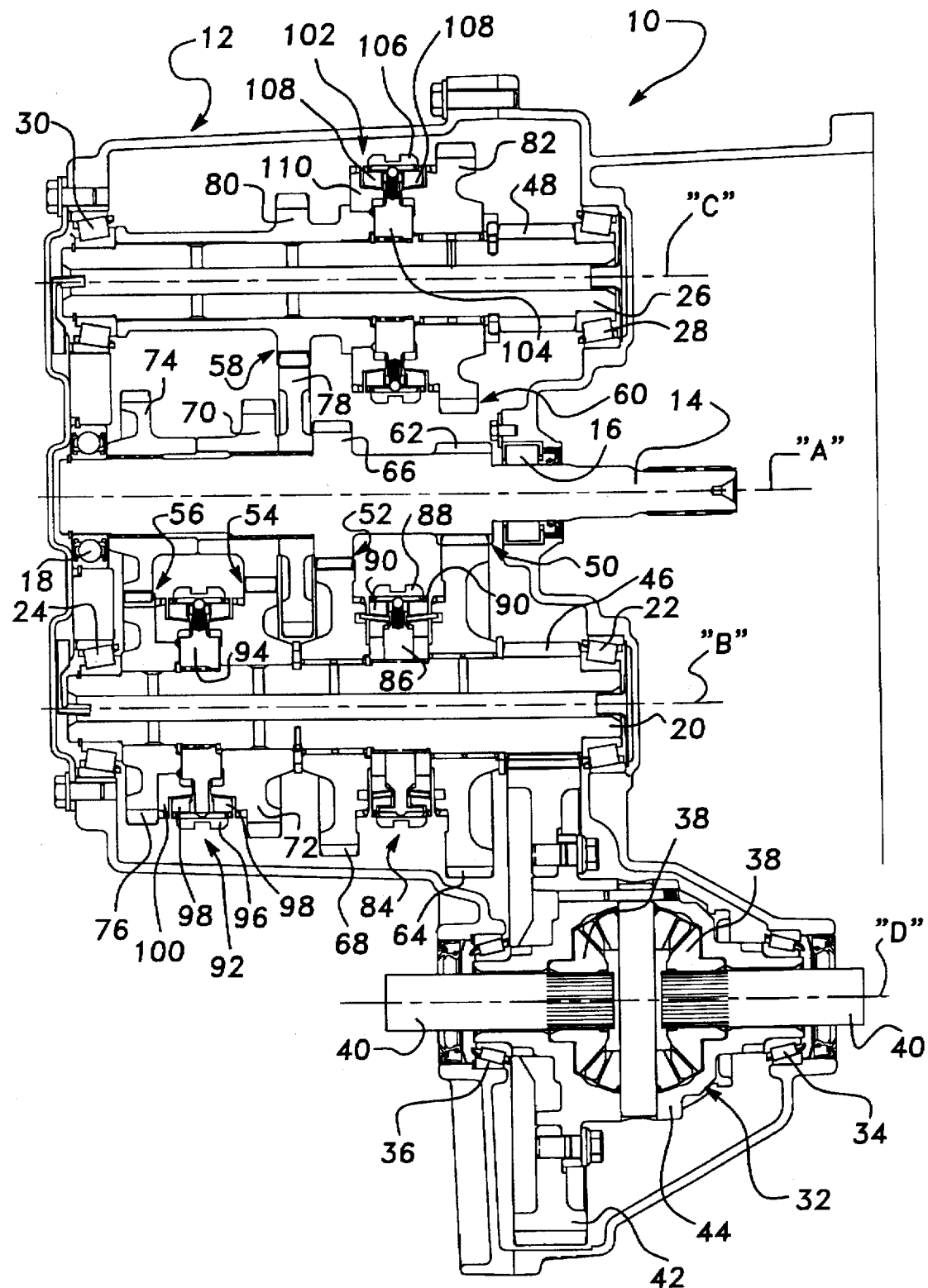
FIG. 1 is a sectional view of a five-speed manual transaxle constructed according to a preferred embodiment of the present invention.

Referring now to the drawings, a manual transaxle 10 is shown that is adapted for use in front wheel drive motor vehicles. Transaxle 10 is a five-speed arrangement having all of its forward and reverse gears synchronized and yet is efficiently packaged to provide a compact gearbox.

With particular reference to FIG. 1, transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicles's engine. Transaxle 10 is also shown to include a first driven or intermediate shaft 20 rotatably supported in housing 12 by bearings 22 and 24 for rotation about second axis "B", a second driven or intermediate shaft 26 rotatably supported in housing 12 by bearings 28 and 30 for rotation about a third axis "C", and a differential 32 supported in housing 12 by bearings 34 and 36 for rotation about a fourth axis "D". As is also conventional, the output of differential 32 includes a pair of axially-aligned side gears 38 to which axle half-shafts 40 are fixed so as to connect differential 32 to the driving wheels of the motor vehicle. The input to differential 32 is a final drive gear 42 fixed to differential cage 44 and which is in constant meshed engagement with a first transfer gear 46 fixed to first intermediate shaft 20 as well as with a second transfer gear 48 fixed to second intermediate shaft 26. It will be appreciated that FIG. 1 is a so-called "unrolled" sectional view wherein shafts 14, 20, 26 and 40 are all arranged in a single plane. However, in reality, these shafts are compactly arranged parallel to each other, with no three thereof in a common plane, as shown in FIG. 3. In this manner, the center distance between the shafts can be effectively minimized.

Transaxle 10 includes a series of constant-mesh gearsets 50, 52, 54, 56, 58 and 60 that can be selectively engaged for establishing five forward speed ratios as well as a reverse speed ratio between input shaft 14 and final drive gear 42. Gearset 50 includes a first input gear 62 fixed to input shaft 14 and a first speed gear 64 rotatably supported on first intermediate shaft 20. First speed gear 64 is in constant mesh with first input gear 62 for defining a first power transmission path that can be selectively engaged to establish a first forward speed ratio. Gearset 52 includes a second input gear 66 fixed to input shaft 14 that is in constant mesh with a second speed gear 68 rotatably supported on first intermediate shaft 20. Thus, gearset 52 functions to define a second power transmission path that can be selectively engaged to establish a second forward speed ratio. Gearset 54 includes a third input gear 70 fixed to input shaft 14 that is in constant mesh with a third speed gear 72 rotatably supported on first intermediate shaft 20. As such, gearset 54 functions to define a third power transmission path that can be selectively engaged to establish a third forward speed ratio. Gearset 56 includes a fourth input gear 74 fixed to input shaft 14 that is in constant mesh with a fourth speed gear 76 rotatably supported on first intermediate shaft 20. Thus, gearset 56 functions to define a fourth power transmission path that can be selectively engaged to establish a fourth forward speed ratio. Gearset 58 includes a fifth input gear 78 fixed to input shaft 14 that is meshed with a fifth speed gear 80 rotatably supported on second intermediate shaft 26. Gearset 56 functions to define a fifth power transmission path that can be selectively engaged to establish a fifth forward speed ratio. Finally, gearset 60 includes a reverse gear 82 rotatably supported on second intermediate shaft 26 that is meshed with first speed gear 64. Gearset 60 defines a sixth power transmission path that can be selectively engaged to establish the reverse speed ratio.

To provide means for establishing the various forward and reverse speed ratios by selectively engaging one of the available power transmission paths, each gearset is associated with a synchronizer clutch. In particular, a first synchronizer clutch 84 is operably located between first and second speed gears 64 and 68 and includes a hub 86 fixed to first intermediate shaft 20, a shift sleeve 88 mounted for rotation with and axial sliding movement on hub 86, and a pair of suitable blocker-type synchronizers 90 interposed between shift sleeve 88 and speed gears 64 and 68. First synchronizer clutch 84 is of the double-acting variety such that forward axial movement of shift sleeve 88 from its centered neutral position shown is adapted to couple first speed gear 64 to first intermediate shaft 20 for establishing the first forward speed ratio in which first transfer gear 46 drives final drive gear 42. Moreover, rearward axial movement of shift sleeve 88 from its neutral position is adapted to couple second speed gear 68 to first intermediate shaft 20 such that first transfer gear 46 drives final drive gear 42 at the second forward speed ratio.

To establish the third and fourth forward speed ratios, a second synchronizer clutch 92 is located between third and fourth speed gears 72 and 76 and includes a hub 94 fixed to first intermediate shaft 20, a shift sleeve 96 mounted for rotation with and axial sliding movement on hub 94, and a pair of blocker-type synchronizers 98 interposed between shift sleeve 96, third speed gear 70 and a clutch gear 100 fixed to fourth speed gear 76. Second synchronizer clutch 92 is of the double-acting type such that forward axial movement of shift sleeve 96 from its neutral centered position shown is adapted to couple third speed gear 72 to first intermediate shaft 20 such that first transfer gear 40 drives final drive gear 42 at the third forward speed ratio. Moreover, rearward movement of shift sleeve 96 from its centered neutral position is adapted to couple fourth speed gear 76 to first intermediate shaft 20 such that first transfer gear 46 drives final drive gear 42 at the fourth speed ratio.

The fifth forward speed ratio and the reverse speed ratio are established via a fourth synchronizer clutch 102, again of the double-acting variety, that is located between fifth speed gear 80 and reverse gear 82. Synchronizer clutch 102 includes a hub 104 fixed to second intermediate shaft 26, a shift sleeve 106 mounted for rotation with and axial sliding movement on hub 104, and a pair of blocker-type synchronizers 108 interposed between shift sleeve 114, reverse gear 82 and a clutch gear 110 fixed to fifth speed gear 80. Rearward sliding movement of shift sleeve 106 from its centered neutral position shown is adapted to couple clutch gear 110 and fifth speed gear 80 to second intermediate shaft 26 such that second transfer gear 48 drives final drive gear 42 at the fifth speed ratio. In contrast, forward sliding movement of shift sleeve 106 from its neutral position couples it to reverse gear 82 such that reverse gear 82 is releasably coupled to second intermediate shaft 26. As such, second transfer gear 48 drives final drive gear 42 at the reverse speed ratio and in the opposite direction with respect to the normal direction of rotation of final drive gear 42 during forward operation. This reversal of direction results from reverse gear 82 being driven by first speed gear 64 which, in turn, is driven by first input gear 62.

In the first forward gear, torque is delivered from input shaft 14 to differential 32 through elements 62, 64, 88, 86, 20, 46 and 42. In the second forward gear, torque is delivered from input shaft 14 to differential 32 through elements 66, 68, 88, 86, 20, 46 and 42. In the third forward gear, torque is delivered from input shaft 14 to differential 32 through elements 70, 72, 96, 94, 20, 46 and 42. In the fourth forward gear, torque is delivered from input shaft 14 to differential 32 through elements 74, 76, 96, 94, 20, 46 and 42. In the fifth forward gear, torque is delivered from input shaft 14 to differential 32 through elements 78, 80, 106, 104, 26, 48 and 42. Finally, in the reverse gear, torque is delivered from input shaft 14 to differential 32 through elements 62, 64, 82, 106, 104, 26, 48, and 42.

FIG. 3 is a schematic illustration of the arrangement of shafts 14, 20, 26 and 40 and of the meshing of the various gearsets. In addition, a shift pattern or gate diagram for transaxle 10 is shown in FIG. 4. Obviously, any suitable shift system coupling each of shift sleeves 88, 96, and 106 to a gearshift lever (not shown) for coordinated movement to establish the various forward and reverse gears can be used with transaxle 10.

The foregoing discussion discloses and describes a presently preferred embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A manual transmission comprising:

an input shaft;

a first intermediate shaft having a first transfer gear fixed thereto;

a first input gear fixed to said input shaft;

a first speed gear rotatably supported on said first intermediate shaft and meshed with said first input gear;

a second input gear fixed to said input shaft;

a second speed gear rotatably supported on said first intermediate shaft and meshed with said second input gear;

a first synchronizer clutch for selectively coupling either of said first and second speed gears to said first intermediate shaft;

a third input gear fixed to said input shaft;

a third speed gear rotatably supported on said first intermediate shaft and meshed with said third input gear;

a fourth input gear fixed to said input shaft;

a fourth speed gear rotatably supported on said first intermediate shaft and meshed with said fourth input gear;

a second synchronizer clutch for selectively coupling either of said third and fourth speed gears to said first intermediate shaft;

a second intermediate shaft having a second transfer gear fixed thereto;

a fifth input gear fixed to said input shaft;

a fifth speed gear rotatably supported on said second intermediate shaft and meshed with said fifth input gear;

a reverse gear rotatably supported on said second intermediate shaft and meshed with said first speed gear;

a third synchronizer clutch for selectively coupling either of said fifth speed gear and said reverse gear to said second intermediate shaft; and a final drive gear meshed with said first and second transfer gears.

2. The manual transmission of claim 1 further comprising a differential driven by said final drive gear.

3. The manual transmission of claim 1 wherein said first synchronizer clutch includes a first shift sleeve mounted for rotation with said first intermediate shaft and movable from a neutral position in a first direction for selectively engaging said first speed gear so as to establish a first forward speed ratio, and wherein said first shift sleeve is movable in a second direction from its neutral position for selectively engaging said second speed gear for establishing a second forward speed ratio.

4. The manual transmission of claim 3 wherein said second synchronizer clutch includes a second shift sleeve mounted for rotation with said first intermediate shaft and movable from a neutral position in a first direction to selectively engage said third speed gear for establishing a third speed ratio, and wherein said second shift sleeve is movable from its neutral position in a second direction for selectively engaging said fourth speed gear for establishing a fourth forward speed ratio.

5. The manual transmission of claim 4 wherein said third synchronizer clutch includes a third shift sleeve mounted for rotation with said second intermediate shaft and movable from a neutral position in a first direction for selectively engaging said fifth speed gear for establishing a fifth forward speed ratio, and wherein said third shift sleeve is movable from said neutral position in a second direction for selectively engaging said reverse gear for establishing a reverse gear ratio.

* * * * *